Patented Feb. 12, 1935

1,991,300

UNITED STATES PATENT OFFICE 1,991,300

PROCESS OF PRODUCING PROTECTIVE COATINGS ON METAL SURFACES

Gustav Tichy and Heinrich Klas, Dusseldorf, Germany

No Drawing. Application February 3, 1932, Serial No. 590,773. In Germany February 18, 1931

5 Claims. (Cl. 134—17)

Tube conduits and cables are usually protected against disturbing influences and particularly against disturbing influences from the ground, by coating same with tar, coal tar pitches, asphalts and mineral oil bituminæ. Substances of this kind are however not well suited for that purpose, since bituminous masses are, only within relatively narrow temperature limits, sufficiently plastic and ductile to form an effective protection for tubes or cables. When asphalts and bituminæ are employed as coating materials the substance to be used must in each particular case be chosen with reference to the average annual temperature prevailing at the place in which the conduit or cable is to be used, in order that the substance used may have a suitable softening point, and thus afford protection under the prevailing temperature conditions. However, as will appear from the following considerations, even this measure is not sufficient to overcome the above mentioned drawback. If bituminæ which become soft at low temperatures are used, these substances may during summer time become liquid and drop off from the tube or cable to which they have been applied. On the other hand if bituminæ which become soft at higher temperatures are used, such substances are liable at lower temperatures, for instance on cold days, to turn brittle and become sensitive to blows and shocks. It has therefore been proposed to increase the range of temperature at which bituminæ become plastic and ductile by adding thereto solid bodies such as lime, rock dust, asbestos and the like and attempts along these lines have in part shown good results.

Consumers and other persons interested in the art feel it to be very desirable to have at their disposal a mass which is well adapted for producing coatings and which possesses, in addition to a relatively large range of ductility and plasticity properties similar to those of caoutchouc.

We have now found through extensive investigations, that masses of excellent properties may be obtained by heating caoutchouc above its melting point until it has become depolymerized and mixing the obtained substance with melted bitumen. We have also found, that it in this way is possible by simply stirring to obtain a fully homogeneous mixture, which within a very wide temperature range has a satisfactory ductility and plasticity and which also possesses the desired caoutchouc-like properties. Contrary to pure bitumen and to bitumen which has been improved by addition of filler substances, the mass produced according to this invention, when in cast state, shows a high resistivity towards mechanical strains such as for instance are created by shocks and oscillations. When protective bituminous coatings are subjected to blows, cracks and crevices are formed in the same. Coatings which are produced in accordance with the present invention never show any damage of this kind and this fact may be taken as a proof that the obtained product really is of a caoutchouc-like nature.

If the mixture is produced from bitumen which already has been mixed with suitable filler substances, the wide temperature range through which the mixture is ductile and plastic is not only maintained but is also considerably widened for low as well as for high temperatures and the caoutchouc-like properties are the same as when the mixture contains no filler substances.

The properties of the bitumen-caoutchouc-mixtures are dependent on the percentage by weight of the depolymerized caoutchouc constituent and the nature and percentage of the filler substances used. By varying these factors the compositions may be adapted for a great variety of different purposes.

Mixtures made according to the invention may, either when in hot and fluid state or in the form of a solution, be applied in known manner to metal objects and other objects. In contrast to known bituminæ, masses made according to the invention may be rolled into plates or strips at all temperatures, even when they become soft at such high temperatures that the pure bitumen contained therein becomes brittle at normal room temperature.

It is possible to insulate cables and steel tubes and protect such bodies against corrosion in a hitherto unknown economical manner by applying thereto plates or strips of the bitumen-caoutchouc mixture. Hitherto the articles to be coated were dipped in the bitumen mass to be applied thereto, or strips of fabric, paper or pasteboard were drawn through the fluid and subsequently applied to the articles. According to the present invention the bitumen-caoutchouc-mixture may simply be rolled into strips of any desired thickness and these strips may at normal room temperature, and even without the aid of strips of fabric, paper and pasteboard, be applied to the articles to be protected.

A still better protection against mechanical strains, such as blows, shocks and scraping, may be obtained by covering the outer surface of the protective covering with a layer of fabric, paper strips or pasteboard. This outer layer may be applied separately or simultaneously with the bitumen-caoutchouc-mixture. In the latter case strips of fabric are attached to one side of the plates or strips of bitumen-caoutchouc-mixture while the latter are produced and the resulting composite body may subsequently be wound upon the body to be protected.

As a further means of ensuring, that the plates or strips adhere firmly to the iron surfaces, the sides of the plates or strips which are to face the object, or the object itself may be heated somewhat. It is of course also possible for this purpose to interpose an intermediate layer of bitumen or other adhesive substance between said plates or strips and such object.

In the process according to the invention a depolymerized crude caoutchouc may for instance be used as a constituent of the mixture. It is advisable, however to add to the mixture of bitumen and depolymerized crude caoutchouc some substance composed of fine fibers, i. e. substances having a great surface effect. Asbestos, particularly asbestos in the form of fine fibers, is exceedingly well suited for this purpose. The amount of filler substances used is dependent upon the purpose for which the mass is designed and may vary between 3–50%.

We have also found that the best results are obtained, when the temperature at which the crude caoutchouc is depolymerized is but slightly higher than the melting temperature of the caoutchouc.

The products obtained by mixing bitumen with depolymerized crude caoutchouc are chemically as inert as the bitumen and may, while in molten state, be applied to the bodies to be protected in the same manner as pure bitumen. Said products may, by rolling at normal temperature, be brought into the form of bands or discs. When said products are dissolved in solvents of the usual kind excellent coating masses are obtained. The films remaining after the solvent has evaporated have the same properties as the non-dissolved mixtures of bitumen and depolymerized crude caoutchouc. Mixtures containing asbestos in the form of fine fibers can, while in dissolved state, be applied without difficulty to the surfaces to be coated by means of spraying devices of the commonly used kind. On account of the mechanical properties of the novel products, bodies coated with the same are completely rust-proof. The products become soft at higher temperatures and also become brittle at lower temperatures than known products of similar kind. Moreover, the novel products are simultaneously plastic and ductile within a wide range of temperatures and the adhesive properties of the same is very high.

We have further found that masses of excellent properties may be obtained by heating vulcanized soft caoutchouc above the melting point until depolymerization has taken place and mixing the treated substance with melted bitumen. To the bitumen used as a constituent of this mass or to the finished mixture filler substances may be added. The production of protective coatings on metal surfaces by means of such mixtures is effected in the before mentioned manner.

Example 1

5 kgs. of crude caoutchouc in the form of crepe are depolymerized by melting same at a temperature of 230–270° C. To this substance a mixture is added, which consists of 65 kgs. of oxidized bitumen having a softening point of 90–100° C. (after K. S.) and of 30 kgs. of fine asbestos fibers having a temperature of about 200° C. During the addition of this mixture the mass should be thoroughly stirred. The obtained mass may at once be applied to the surface of tubes or the like, for instance by means of wool felt pasteboard or jute, or may be poured into the interior of tubes and be uniformly distributed by centrifugal force. The mass, after cooling, adheres firmly to the object to be protected. The softening point usually lies above 130° C. By tests made with an iron plate placed at an angle of 45° in a drying chamber it was found that the temperature had to be raised to 120° C. before an insignificant flow motion in the mass became perceptible. A tube section having a length of 100 mm. and a diameter of 160 mm. coated with the mixture can at 0° C. be flattened in a press without the production of any cracks or ruptures in the coating. The coating will neither scale off from the iron surface if the latter for technical reasons has been given a ground coating of a solution of the mass. Rings internally coated with said mixture can at 0° C. repeatedly be dropped from a height of 7 m. without any cracks being formed in the coating and without scales loosening from the same. A ring of this kind was held in boiling water for 15 minutes without the mass becoming fluid or shrinking up.

The mass may also be dissolved in heavy benzene to which a quantity of benzol has been added. This product will yield a grounding substance of extraordinarily high holding power.

Example 2

Vulcanized soft caoutchouc obtained from waste caoutchouc is depolymerized by melting same, and 5 parts of the molten mass are stirred together with 65 parts of a molten mineral oil bitumen, whereupon 30% of filler substances in the form of fine asbestos fibers are added under continuous stirring. The obtained fluid mass is poured into suitable moulds and cooled. The castings may thereupon in a rolling mill or a calender be converted into plates or strips of any desired thickness.

We claim:—

1. A process of producing compositions suitable for use as protective coatings on metal surfaces, comprising the steps of depolymerizing caoutchouc at a temperature of from 230° C. to 270° C. and mixing the depolymerized caoutchouc with molten bitumen.

2. A process of producing compositions suitable for use as protective coatings on metal surfaces, comprising the steps of depolymerizing caoutchouc at a temperature of from 230° C. to 270° C. and mixing the depolymerized caoutchouc with molten bitumen and filler substances.

3. A process of producing compositions suitable for use as protective coatings on metal surfaces, comprising the step of depolymerizing caoutchouc at a temperature of from 230° C. to 270° C. and mixing the depolymerized caoutchouc with molten bitumen and fine asbestos fibers.

4. A process of producing compositions suitable for use as protective coatings on metal surfaces, comprising the steps of depolymerizing caoutchouc at a temperature of from 230° C. to 270° C., mixing the depolymerized caoutchouc with molten bitumen and filler substances, and dissolving the obtained mixture in solvents.

5. A process of producing compositions suitable for use as protective coatings on metal surfaces, comprising the step of depolymerizing vulcanized soft caoutchouc at a temperature of from 230° C. to 270° C., mixing the depolymerized vulcanized soft caoutchouc with molten bitumen and filler substances.

GUSTAV TICHY.
HEINRICH KLAS.